(12) United States Patent
Kim et al.

(10) Patent No.: US 7,222,886 B2
(45) Date of Patent: May 29, 2007

(54) HOSE CLAMPING ASSEMBLY

(75) Inventors: Hyung Suk Kim, Busan (KR); In Chan Jeon, Busan (KR); Sung Ryong Hur, Busan (KR); Chun Won Chol, Busan (KR); Byoung Ki Kang, Busan (KR)

(73) Assignee: HS R&A Co., Ltd., Gyeongsangnam-Do (KR)

( * ) Notice: Subject to any disclaimer, the term of this patent is extended or adjusted under 35 U.S.C. 154(b) by 0 days.

(21) Appl. No.: 10/788,366

(22) Filed: Mar. 1, 2004

(65) Prior Publication Data

US 2005/0104370 A1    May 19, 2005

(30) Foreign Application Priority Data

Nov. 15, 2003    (KR)   ...................... 10-2003-0080813

(51) Int. Cl.
*F16L 33/00*    (2006.01)
(52) U.S. Cl. .................. 285/239; 285/133.11; 285/398
(58) Field of Classification Search ............... 285/21.1, 285/133.11, 238, 23, 114, 116, 148.7, 133.5, 285/132.1, 285.1, 293.1, 398, 239; 249/89
See application file for complete search history.

(56) References Cited

U.S. PATENT DOCUMENTS

| | | | |
|---|---|---|---|
| 1,780,978 A * | 11/1930 | Lutzow .................. | 285/133.11 |
| 4,648,928 A * | 3/1987 | Ales ........................... | 156/164 |
| 4,903,998 A | 2/1990 | Stanley | |
| 4,997,213 A | 3/1991 | Traner et al. | |
| 5,039,134 A * | 8/1991 | Meadows et al. ....... | 285/133.11 |
| 5,411,300 A * | 5/1995 | Mitsui ..................... | 285/294.1 |
| 5,447,341 A * | 9/1995 | Hartel et al. ................. | 285/238 |
| 6,065,782 A | 5/2000 | Allen, Jr. | |
| 6,315,331 B1 | 11/2001 | Krause et al. | |

* cited by examiner

*Primary Examiner*—Aaron Dunwoody
(74) *Attorney, Agent, or Firm*—Birch, Stewart, Kolasch & Birch, LLP

(57) ABSTRACT

A hose clamping assembly comprises a branched pipe having a plurality of projected stoppers thereon, each of the stoppers formed around an outer surface of each branch of the branched pipe and spaced apart a certain distance from each other, a hose connected to each branch of the branched pipe by sliding onto each of the branches, the hose contacting a nearest stopper from the end portion of the branch among the plurality of stoppers, a clamp formed on an outer surface of the hose and between the stoppers by a molding apparatus, a portion of the clamp on the outer surface of the hose connected to a portion of the clamp between the stoppers and an arm connecting the clamp to an adjacent clamp having a different axial direction, the arm formed by the molding apparatus.

10 Claims, 3 Drawing Sheets

HOSE CLAMPING ASSEMBLY

The present invention claims the benefit of Korean Patent Application No. 2003-80813, filed in Korea on Nov. 15, 2003, which is hereby incorporated by reference.

BACKGROUND OF THE INVENTION

1. Field of the Invention

The present invention relates to a hose clamping assembly, and more particularly, to a hose clamping assembly including a clamp and an arm connecting the clamp to another clamp.

2. Discussion of the Related Art

In general, a piping system is necessarily required for cooling a mechanical device or providing oil to the mechanical device in a mechanical system such as an automobile or an industrial plant system. The pipe is usually made of metal, resin or rubber.

In those piping system, many different types of elbows are used for connecting the pipes or switching a pipe direction, and sealing material such as bonds or sealant is used for sealing a junction of the piping system.

Meanwhile, a flexible rubber hose is generally selected for a piping system of a cooling system or an oil supply system of the automobile. The reason is because of a severe vibration and a narrow installation space of the automobile. That is, because the piping system of the automobile has to endure a repetitious vibration, the pipe is usually made of rubber and because there is not enough space in the engine room for the installation of the piping system, the flexible rubber hose is required for an easy installation.

To convert a flowing direction of the fluid in the hose or pipe, a branched pipe such as a T-shaped pipe or a Y-shaped pipe, for example, may be used. Many different methods to connect hoses to the branched pipe have been developed in the field.

FIG. 1 is a partial cross-sectional view illustrating a hose connecting structure according to the related art. As shown in the figure, an open hole 12 is formed in a main hose 10 and a hose-connecting pipe 20 having a flange at one end is fitted into the open hole 12. A branch hose 30 slides onto an outer surface of the hose-connecting pipe 20 and is disposed at a position adjacent to the outer surface of the main hose 10. An interval between an end portion of the branch hose 30 and the outer surface of the main hose 10 is filled with a rubber material by a molding apparatus so that a junction of the hose can be sealed to prevent a leakage of the fluid. However, in the fore mentioned related art, because the open hole 12 must be formed in the main hose 10 and then the additional hose-connecting pipe 20 must be fitted into the open hole 12, a hose-connecting process is somewhat complex. In addition, because an area that the rubber molding should cover is wide, the molding material such as rubber is wasted.

FIG. 2 is a cross-sectional view illustrating a hose connecting structure according to another related art, i.e., U.S. Pat. No. 4,997,213. The US patent discloses an encapsulated branch coolant hose. As shown in the figure, the encapsulated branch coolant hose of the related art mainly comprises a T-shaped connector 10, hoses 14 that slides onto the outer surface of the T-shaped connector 10 and a polymer capsule that covers the whole junction area between the connector 10 and end portions of the hoses 14. However, in the above-mentioned patent, the polymer for forming the capsule is also wasted because the polymer capsule is formed to cover the whole area of the junction between the connector 10 and the hoses 14.

SUMMARY OF THE INVENTION

Accordingly, the present invention is directed to a hose clamping assembly that substantially obviates one or more of problems due to limitations and disadvantages of the related art.

An object of the present invention is to provide a hose clamping assembly in which an waste of molding material can be prevented by minimizing a clamp forming area and the hose can be more stably connected to a branched pipe by forming an arm connecting the clamp to another clamp adjacent.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a hose clamping assembly comprises a branched pipe having a plurality of projected stoppers thereon, each of the stoppers formed around an outer surface of each branch of the branched pipe and spaced apart a certain distance from each other, a hose connected to each branch of the branched pipe by sliding onto each of the branches, the hose contacting a nearest stopper from the end portion of the branch among the plurality of stoppers, a clamp formed on an outer surface of the hose and between the stoppers by a molding apparatus, a portion of the clamp on the outer surface of the hose connected to a portion of the clamp between the stoppers, and an arm connecting the clamp to an adjacent clamp having a different axial direction, the arm formed by the molding apparatus.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, which is illustrated in the accompanying drawings.

Figure 1:
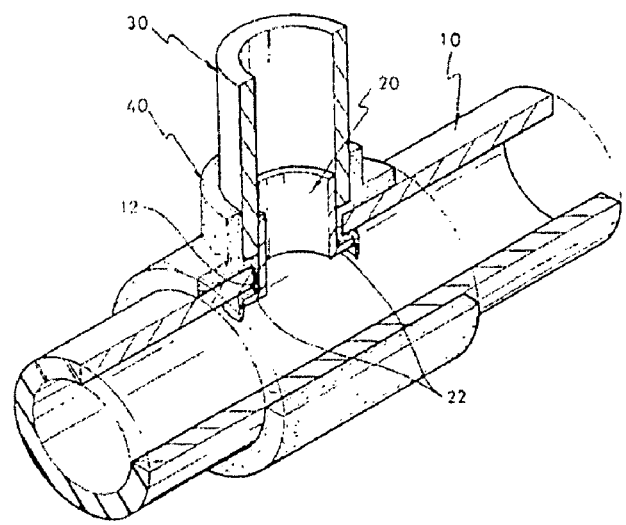
FIG. 1 is a partial cross-sectional view illustrating a hose connecting structure according to the related art.
Figure 2:
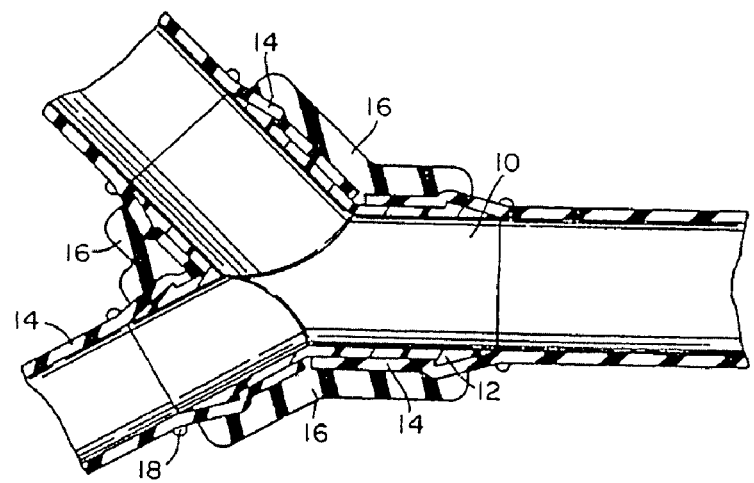
FIG. 2 is a cross-sectional view illustrating a hose connecting structure according to another related art.
Figure 3:
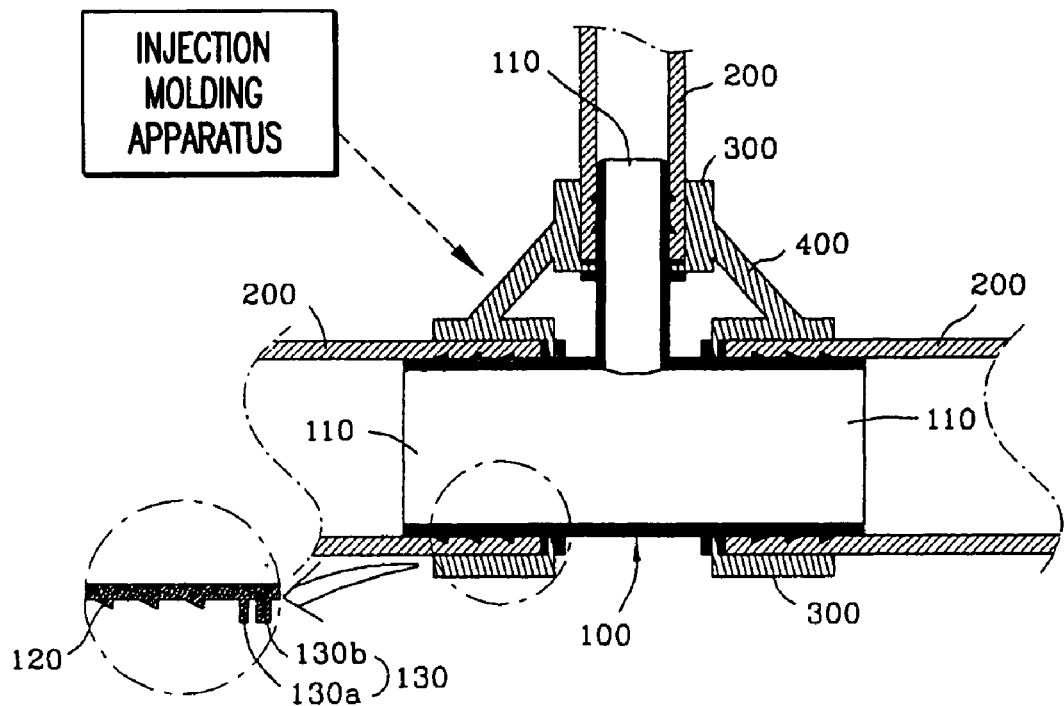
FIG. 3 is a cross-sectional view illustrating a hose clamping assembly according to a first embodiment of the present invention.

FIG. 3 is a cross-sectional view illustrating a hose clamping assembly according to a first embodiment of the present invention. As shown in the figure, a hose clamping assembly of the present invention mainly comprises a branched pipe 100, a hose 200, a clamp 300 and an arm 400. Each branch of the branched pipe 100 has an exit 110 at one end of the branch and a T-shaped pipe is selected as the branched pipe 100 for an explanation. A plurality of protrusions 120 shaped like a ring is formed on an outer surface of each branch of the branched pipe 100 to prevent a slip of the hose 200 and a plurality of projected stoppers 130 is also formed on an outer surface of each branch of the branched pipe 100. A vertical cross-section of the stopper 130 is shaped like a doughnut and is disposed at a position nearer from the intersection of the branches than the protrusions 120. That is, when the hose 200 slides onto the branch of the branched pipe 100, an end of the hose 200 contacts a lateral surface of the stopper 130 past the plurality of protrusions 120. It is desirable that at least two stoppers 130 are formed around the outer surface of each branch of the branched pipe 100 and the stoppers 130 are spaced apart from each other. In the figure, there are first and second stoppers 130a and 130b formed on the branch of the branched pipe 100.

One end of the hose 200 slides onto the branch of the branched pipe 200 and then contacts the lateral surface of the first stopper 130a past the protrusions 120 as shown in the figure. Flexible material such as a rubber or a resin may be selected for forming the hose 200. A clamp 300 is formed on the hose 200 to cover a portion of an overlapped area between the hose 200 and the branch of the branched pipe 100 and a space between the stoppers 130. That is, the clamp 300 is formed on the hose 200 and the interval between the stoppers 130 at a time by a molding apparatus. As shown in the figure, the clamp 300 on a horizontal branch is connected to the clamp 300 on a vertical branch by the arm 400 that is formed at the same time together with the clamp 300 by the molding apparatus. That is, the arm 400 connects the clamp 300 to the clamp 300 having a different axial direction. Molding of the clamp 300 and the arm 400 can be done by any means known to those skilled in the field and it is desirable to adopt an injection molding method for the forming of the clamp 300 and the arm 400 in a single body.

In the fore mentioned embodiment, only one arm 400 is formed between the clamps 300 perpendicular to each other. However, the number of the arm 400 formed between the clamps 300 can be varied depending on the situation. That is, two arm 400, for example, may be formed between the clamp 300 and the adjacent clamp 300 having a different axial direction in order for the clamp 300 to secure a connection between the hose 200 and the branched pipe 100 more firmly and stably. Accordingly, even when one of the arms 400 is broken, the rest of the arm 400 can be used for connecting the clamp 300 stably.

Figure 4:
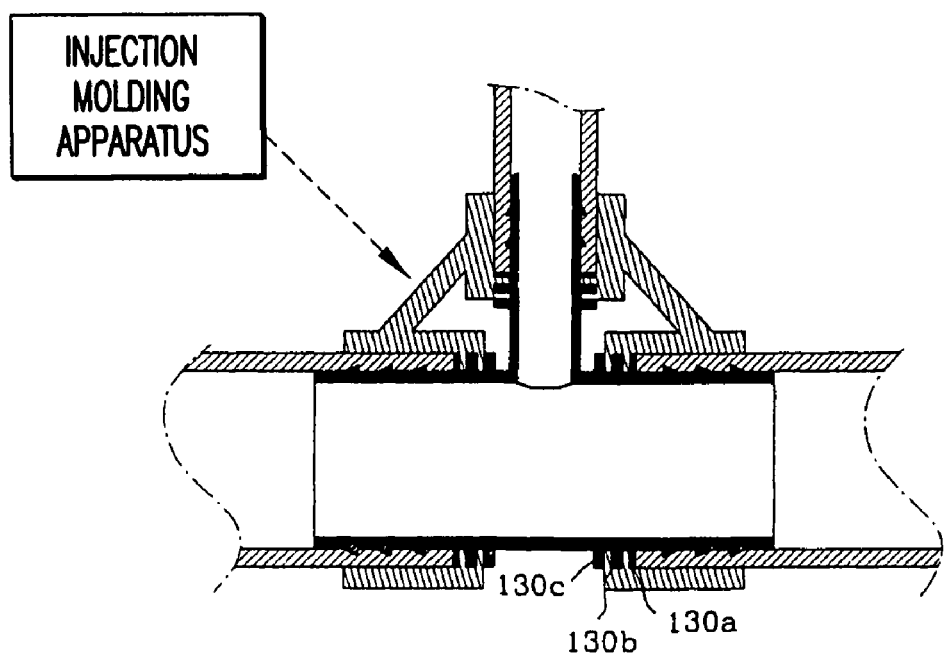
FIG. 4 is a cross-sectional view illustrating a hose clamping assembly according to a second embodiment of the present invention.

FIG. 4 is a cross-sectional view illustrating a hose clamping assembly according to a second embodiment of the present invention. As shown in the figure, first, second and third stoppers 130a, 130b and 130c are formed on the branched pipe 100 in the second embodiment of the present invention. Because the clamp 300 can be formed at a space between the second and third stoppers 130b and 130c as well as the space between the first and second stoppers 130a and 130b, the clamp 130 can join the hose 200 with the branched pipe 100 more firmly and stably than the first embodiment of the present invention. This is because contact areas between the clamp 300 and the stopper 130 and between the clamp 300 and the branched pipe 100 are increased.

Figure 5:
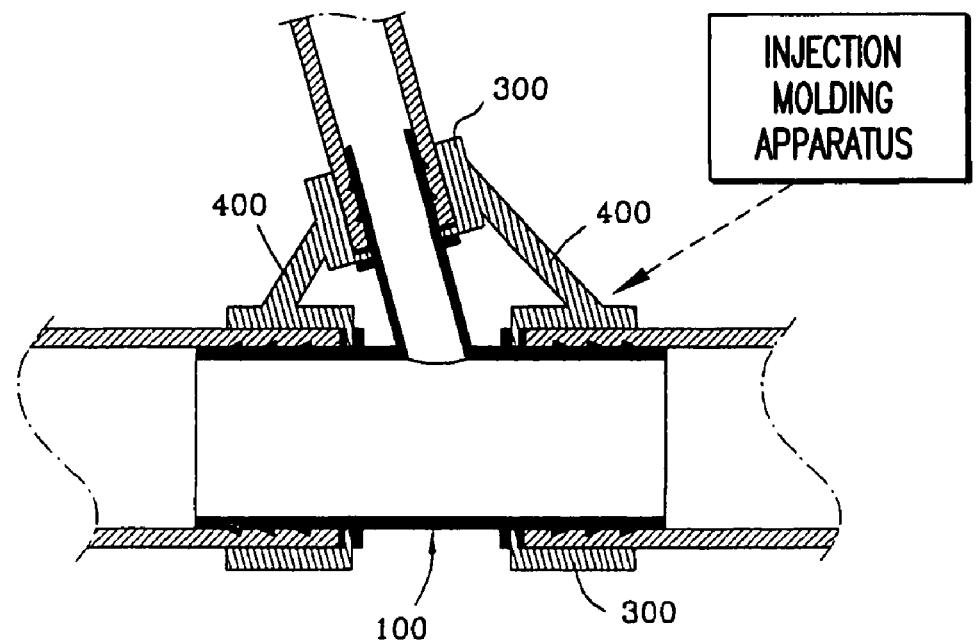
FIG. 5 is a cross-sectional view illustrating a hose clamping assembly according to a third embodiment of the present invention.

FIG. 5 is a cross-sectional view illustrating a hose clamping assembly according to a third embodiment of the present invention. In the third embodiment, a branch of the branched pipe 100 forms an angle from the horizontal branch of the branched pipe 100 as shown in the figure. That is, the branched pipe 100 is a Y-shaped pipe. In the third embodiment, a plurality of protrusions 120 and a plurality of stoppers 130 are formed on an outer surface of each branch of the branched pipe 100 like in the previous embodiments. That is, after the respective hoses 200 have been fitted onto the branched pipe 100 so as for one end of the hose 200 to contact the side of the stopper 130, the assembly of the branched pipe 100 and the hose 200 may then be fixed into a conventional molding apparatus to form the clamp 300 and the arm 400 at the same time. In the previous embodiments of the present invention, the arm 400 in the left is symmetrical to the arm 400 in the right because the branched pipe 100 is a T-shaped pipe. However, in the third embodiment, the branched pipe 100 is a Y-shaped pipe and thus one of the branch forms different angles measured respectively from other branches in the left and right. Accordingly, the arm 400 in the left is asymmetrical to the arm 400 in the right in the figure.

Figure 6:
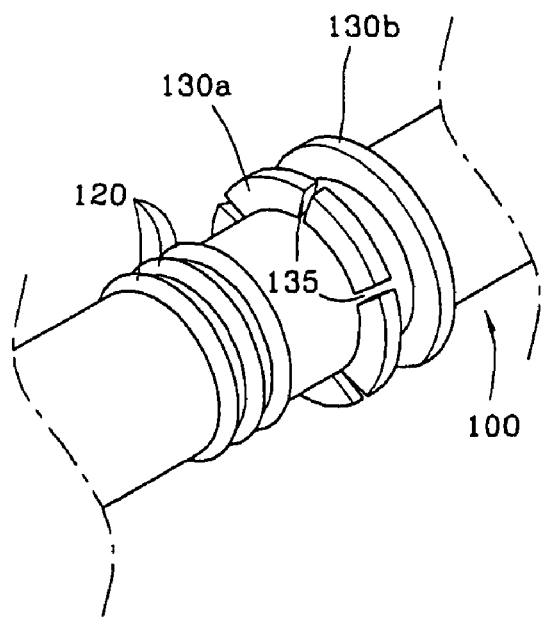
FIG. 6 is a perspective view illustrating a shape of a stopper on a pipe according to a fourth embodiment according to the present invention.

FIG. 6 is a perspective view illustrating a shape of a stopper on a pipe according to a fourth embodiment according to the present invention. In the fourth embodiment of the present invention, a plurality of open-cuts 135 is formed in one of or all of the stoppers 130 as shown in the figure. In the figure, first and second stoppers 130a and 130b are formed on an outer surface of the branched pipe 100. Unlike the previous embodiments, a plurality of open-cuts 135 may be formed in the first stopper 130a in a circumferential direction as shown in the figure. An advantage of this structure is that the plurality of open-cuts 135 increases the contact areas between the clamp 300 and the hose 200 and between the clamp 300 and the branched pipe 100 so as to connect the hose 200 to the branched pipe 100 more firmly. In addition, because the hose 200 contacts the clamp 300 at the open-cuts 135 as well as on the hose, a resistant force against the twist of the hose 200 can be increased so that a leakage of the fluid may be prevented near a junction of the hose 200 and the branched pipe 100.

The advantages of the present invention are as follows. First, the resin material for forming the clamp can be saved by molding the clamp and the arm only on an optimized area such as on a portion of the hose and the space between the stoppers. Secondly, forming the clamp and the arm in a single body by the molding apparatus can strengthen the connection between the hose and the branched pipe. Thirdly, the hose clamping assembly can have a more strong resistance against the twist of the hose by forming a plurality of the open-cuts in the stopper.

It will be apparent to those skilled in the art that various modifications and variations can be made in the array substrate for IPS mode liquid crystal display device and method for fabricating the same of the present invention without departing from the spirit or scope of the invention. Thus, it is intended that the present invention cover the modifications and variations of this invention provided they come within the scope of the appended claims and their equivalents.

What is claimed is:

1. A hose clamping assembly, comprising:
   a branched pipe having a plurality of projected stoppers thereon, each of the stoppers located around an outer surface of each branch of the branched pipe and spaced apart a certain distance from each other for receiving a hose adapted to be connected to each branch of the branched pipe by sliding onto each of the branches, the hose adapted to contact a nearest stopper from the an end portion of the branch among the plurality of stoppers;
   a clamp adapted to be positioned on an outer surface of the hose and between the stoppers, so that a portion of the clamp on the outer surface of the hose is connected to a portion of the clamp between the stoppers; and
   an arm connecting the clamp to an adjacent clamp having a different axial direction; and
   wherein the clamp on the outer surface of the hose has two portions separated from each other at least by the aforementioned spaced apart distance between the stoppers.

2. The hose clamping assembly according to claim 1, wherein each branch has an exit and further comprising a plurality of protrusions located on an outer surface of the branch and between an exit of the branch and the stopper.

3. The hose clamping assembly according to claim 1, wherein the clamp and the arm are formed in a single body.

4. The hose clamping assembly according to claim 2, wherein at least one arm is located between the clamp and the adjacent clamp having a different axial direction.

5. The hose clamping assembly according to claim 1, wherein the branched pipe is a T-shaped pipe.

6. The hose clamping assembly according to claim 1, wherein the branched pipe is a Y-shaped pipe.

7. The hose clamping assembly according to claim 1, wherein at least one of the stoppers has a plurality of open-cuts disposed in a circumferential direction.

8. The hose clamping assembly according to claim 1, further comprising a plurality of adjacent stoppers located on at least one branch pipe.

9. The hose clamping assembly according to claim 8, wherein the clamp contains an annular portion adapted to fit between the plurality of adjacent stoppers located on the at least one branch.

10. The hose clamping assembly of claim 1, wherein the plurality of stoppers comprises three stoppers and wherein the portion of the clamp on the outer surface of the hose comprises two portions located between the three stoppers.

* * * * *